(12) United States Patent
Pirklbauer et al.

(10) Patent No.: US 11,459,082 B2
(45) Date of Patent: Oct. 4, 2022

(54) AIRCRAFT WITH A FUSELAGE, LUGGAGE HOLDER FOR AN AIRCRAFT, AND AIR CARGO CONTAINER HAVING A LUGGAGE HOLDER

(71) Applicant: Airbus Operations GmbH, Hamburg (DE)

(72) Inventors: Peter Leopold Pirklbauer, Hamburg (DE); Peter Sander, Hamburg (DE); Uwe Panzram, Hamburg (DE); Jan Reh, Hamburg (DE); Michael Sillus, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 1042 days.

(21) Appl. No.: 16/146,231

(22) Filed: Sep. 28, 2018

(65) Prior Publication Data
US 2019/0092446 A1 Mar. 28, 2019

(30) Foreign Application Priority Data
Sep. 28, 2017 (DE) .......................... 102017122599.4

(51) Int. Cl.
*B64C 1/22* (2006.01)
*B64D 9/00* (2006.01)

(52) U.S. Cl.
CPC . *B64C 1/22* (2013.01); *B64D 9/00* (2013.01)

(58) Field of Classification Search
CPC .................................... B64C 1/22; B64D 9/00
See application file for complete search history.

(56) References Cited

U.S. PATENT DOCUMENTS

| | | | |
|---|---|---|---|
| 3,028,130 A | 4/1962 | Burton | |
| 3,776,492 A * | 12/1973 | Iben | B64C 1/22 244/137.1 |
| 5,335,880 A * | 8/1994 | Klug | B64C 1/1415 105/280 |
| 8,976,531 B2 | 3/2015 | Bayliss et al. | |
| 2006/0038077 A1* | 2/2006 | Olin | G06Q 10/08 244/137.1 |
| 2010/0276538 A1* | 11/2010 | Helou, Jr. | B64C 39/02 244/118.1 |

OTHER PUBLICATIONS

German Search Report; priority document.

* cited by examiner

*Primary Examiner* — Nicholas McFall
(74) *Attorney, Agent, or Firm* — Greer, Burns & Crain, Ltd.

(57) ABSTRACT

A cargo hold comprises at least one luggage holder having at least one luggage compartment, wherein, when the hatch is in the closed state, the luggage holder is arranged in the cargo hold, and wherein, when the hatch is in the opened state, the luggage holder can be brought out of the cargo hold and can be introduced therein again by means of a guide mechanism in such a manner that the luggage holder, when it is brought out of the cargo hold, is arranged substantially radially to the substantially elliptical cross section of the fuselage.

7 Claims, 2 Drawing Sheets

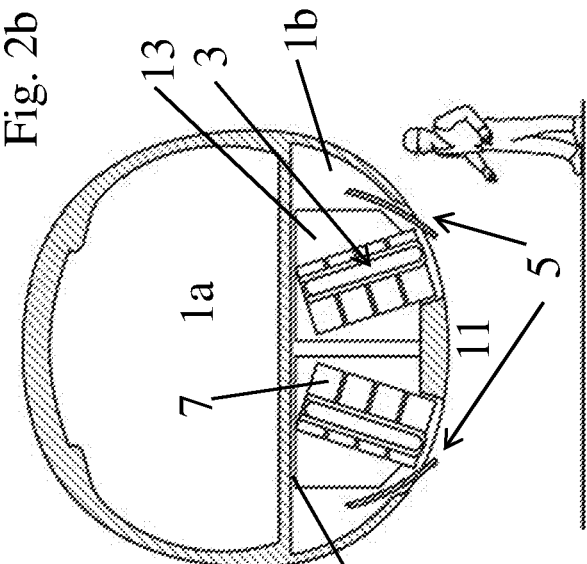
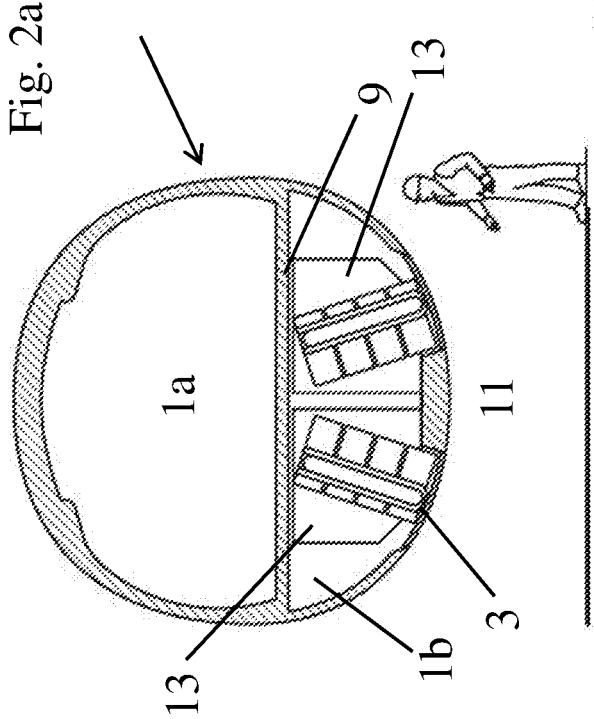
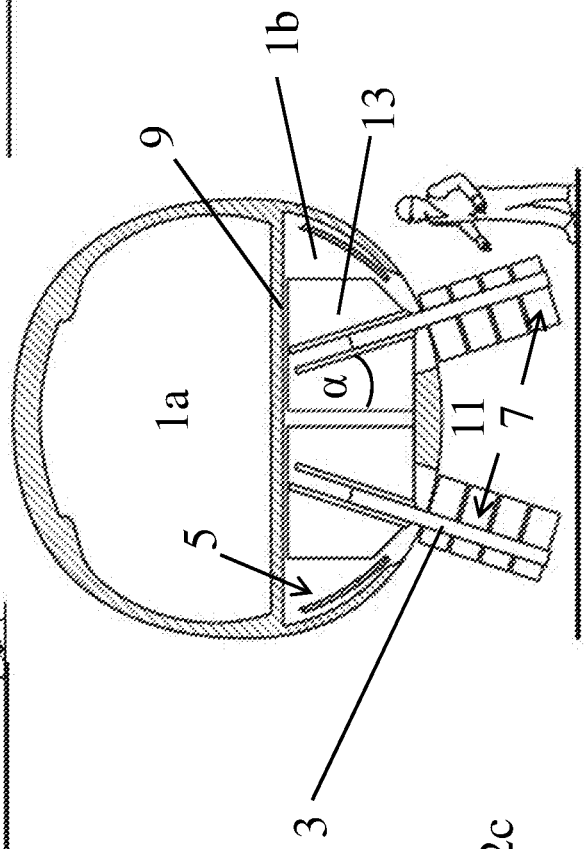

AIRCRAFT WITH A FUSELAGE, LUGGAGE HOLDER FOR AN AIRCRAFT, AND AIR CARGO CONTAINER HAVING A LUGGAGE HOLDER

CROSS-REFERENCES TO RELATED APPLICATIONS

This application claims the benefit of the German patent application No. 10 2017 122 599.4 filed on Sep. 28, 2017, the entire disclosures of which are incorporated herein by way of reference.

BACKGROUND OF THE INVENTION

The present application relates to an aircraft with a fuselage, wherein the fuselage has a substantially elliptical cross section, and wherein the fuselage has a separate upper fuselage region and a lower fuselage region, wherein the lower fuselage region comprises a cargo hold, and wherein the cargo hold has at least one hatch which, in the closed state, closes the lower fuselage region, and which, in the open state, opens the lower fuselage region to such an extent that cargo can be introduced into and/or brought out of the cargo hold.

A separate upper fuselage region is, for example, a passenger cabin which is spatially separated from the cargo hold, which is located in the lower fuselage region. (Different conditions of admission apply for these fuselage regions.)

Furthermore, the present invention relates to a luggage holder for an aircraft, and to an air cargo container having a luggage holder according to the invention.

In the case of flights, the luggage is normally brought into the cargo hold of the aircraft by the ground personnel before the passengers enter the aircraft cabin, either in the form of loose luggage or else in containers. When the aircraft has landed at the destination airport, the passenger has to go to a separate collection area to collect the luggage at a luggage belt. The passenger generally waits there for a while for his case, with it being uncertain when or whether the passenger's own case will appear on the luggage belt.

A disadvantage from the prior art is that, for the loading of a conventional aircraft, a great deal of logistical effort is necessary in order to realize correct loading of the luggage. This logistical chain requires ground personnel (for collecting the luggage items and for manually loading the luggage items) and devices (transport belts, transport vehicles). A further disadvantage is that, firstly, the passenger has to plan for a great deal of time for accomplishing this logistical chain. Secondly, the passenger does not know where his luggage is actually located.

SUMMARY OF THE INVENTION

It is therefore an object of the present invention to provide an aircraft, a luggage holder for an aircraft, and an air cargo container having a luggage holder, in which a lesser logistical effort is needed for loading and unloading an aircraft, and therefore passengers rapidly receive back their cases after landing.

The aircraft according to the invention has a fuselage with a substantially elliptical cross section. The fuselage has a separate upper fuselage region, i.e., for example, a passenger cabin. Furthermore, the fuselage has a lower fuselage region, wherein the lower fuselage region comprises a cargo hold, and wherein the cargo hold has at least one hatch which, in the closed state, closes the lower fuselage region, and which, in the open state, opens the lower fuselage region to such an extent that cargo can be introduced into and/or brought out of the cargo hold.

The particular characteristic of the solution presented in the present application is that the cargo hold comprises at least one luggage holder having at least one luggage compartment, wherein, when the hatch is in the closed state, the luggage holder is arranged in the cargo hold, and wherein, when the hatch is in the opened state, the luggage holder can be brought out of the cargo hold and can be introduced therein again by means of a guide mechanism in such a manner that the luggage holder, when it is brought out of the cargo hold, is arranged substantially radially to the substantially elliptical cross section of the fuselage.

Within the context of the present application, substantially elliptical may also mean substantially circular or more generally round. Of course, components which influence the fuselage cross section may be mounted on the aircraft fuselage in the interior or on the exterior. In addition, an aircraft fuselage deforms depending on pressure conditions.

In the present case, substantially radially means running in a ray-like or rectilinear manner for example, this can mean oriented in a ray-like manner from a center point of the substantially elliptical cross section or else from the vicinity of the center point. In principle, however, the lower and the upper (separate) fuselage sections are separated from each other by a separating plane, and therefore the cargo hold has a cargo hold ceiling. In the present case, radially means, in particular, that the luggage holder, when it is brought out of the cargo hold, is arranged at an angle to the separating plane. Such a separating plane can especially also run parallel to the flat upper side of a standard air cargo container.

The hatch according to the invention can be configured here, for example, in a manner such that it can be folded upward or pivoted upward or can also be displaced in order to be brought from a closed into an open state or vice versa. Depending on the size of the hatch, one or more luggage holders can be moved out of the cargo hold by means of a guide mechanism.

The luggage holder can have an individual luggage compartment for receiving a relatively large item of luggage or else a multiplicity of smaller luggage compartments. Preferably, an item of luggage can simply be placed into a luggage compartment by a passenger. The fuselage preferably has a lowest region which, when the aircraft is in a state landed on the ground, is closest to the ground, wherein the normal of the lowest region towards the ground is approximately of a length of 100 to 130 cm. A passenger can thereby readily reach his case.

The guide mechanism can be configured, for example, linearly. The luggage holder here can be coupled to the guide mechanism, for example via rails. The guide mechanism preferably also comprises an electrical activation which is also coupled to the opening of the hatches, and therefore the hatches do not have to be opened manually, but rather are opened in practice via a central command.

Furthermore preferably, the guide mechanism is arranged at an angle of less than 90° to the perpendicular between the ground and the lowest region of the fuselage, especially preferably at an angle of approx. 35° to 45°. The luggage holder is thereby slightly inclined, and therefore items of luggage located in the luggage compartments cannot drop out. At the same time, passengers have a good overview over the luggage compartments and can easily remove their luggage.

The luggage holder according to the invention for an aircraft comprises at least one luggage compartment for receiving luggage. However, a luggage holder preferably has a multiplicity of identical luggage compartments, and therefore standardized cases can be stowed in a space-saving manner.

Especially preferably, the at least one luggage compartment is configured for receiving luggage of up to approximately 23 kg. By this means, even heavier items of luggage than only hand luggage having a maximum weight of 8 kg in each case can be received in the luggage holder.

The at least one luggage compartment of the luggage holder preferably has securing means for holding luggage. These can be simple grids, but elastic straps or bolt-like securing means are also conceivable.

Especially preferably, the at least one luggage compartment has an identification reading means for luggage located therein. This can be, for example, a reading device on the basis of Radio Frequency Identification (RFID) or Near Field Communication (NFC) technology. Items of luggage which have a corresponding interface can therefore be compared with the information provided by the on-board system. For example, it can thereby be prevented that a passenger brings luggage on board which is not intended for the flight.

The luggage holder can furthermore be arranged in a standard air cargo container (e.g., L3), and therefore, after landing, luggage can optionally be easily brought to a connecting flight or can already be handed over by the passenger although the aircraft is not yet in situ. In this variant of the invention (if the container is already located in the aircraft), the upper side of the standard air cargo container runs parallel to the separating plane. The guide mechanism can be fastened directly here to the upper side of the container, and therefore the luggage holder can be entirely arranged in its retracted state in the interior of the container.

In the same manner as the aircraft or the cargo hold, such a standard air cargo container can have hatches which can be opened. Alternatively, however, the container can also be open downwards, and therefore only the aircraft has to have hatches through which the luggage holders can be introduced or brought out. In the most reduced version of the container, only a rack corresponding to the size of a standard air cargo container is used.

BRIEF DESCRIPTION OF THE DRAWINGS

The invention is explained below with reference to the drawing.

FIG. 2a shows a schematic cross section through an aircraft fuselage having the luggage holder according to the invention in a standard air cargo container with a closed hatch, FIG. 2b shows a schematic cross section through an aircraft fuselage having the luggage holder according to the invention in a standard air cargo container with a hatch which is not yet completely open, and FIG. 2c shows a schematic cross section through an aircraft fuselage having the luggage holder according to the invention brought out of the standard air cargo container and the cargo hold, with an open hatch.

DETAILED DESCRIPTION OF THE PREFERRED EMBODIMENTS

It should first of all be mentioned that the landing gear supporting the fuselage is not shown throughout the figures for the sake of clarity.

Figure 1A:
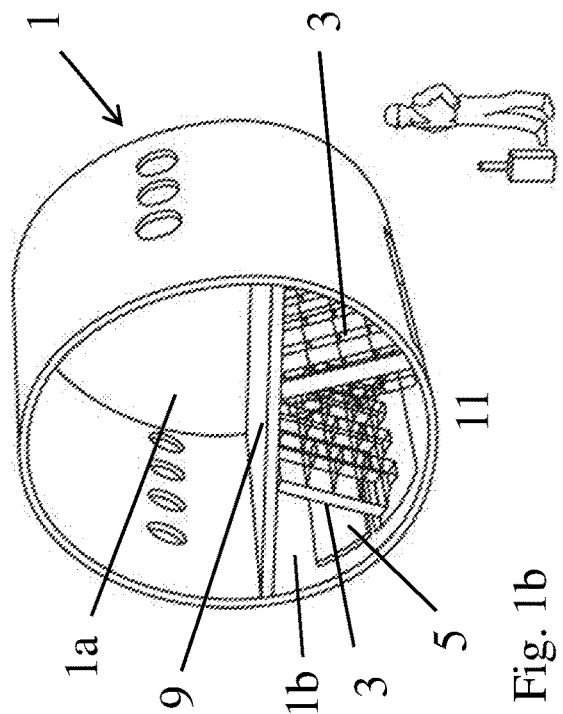
FIG. 1a shows a schematic perspective cross section through an aircraft fuselage having the luggage holder according to the invention with a closed hatch.

A perspective cross section through an aircraft fuselage 1 having two luggage holders 3 according to the invention can be seen schematically in FIG. 1a, wherein the two hatches 5 are closed. In the present case, the fuselage 1 has a circular cross section, but it may, of course, also be formed differently, e.g., it can have a greater width than height.

The fuselage 1 has an upper fuselage region 1a and a lower fuselage region 1b, in which the cargo hold is located. In FIG. 1a, the cargo hold has two hatches 5 which, in the closed state, close the lower fuselage region 1b. Of course, a plurality of hatches 5 which can be opened either all simultaneously or independently of one another are also conceivable. In the present case, the cargo hold comprises a multiplicity of luggage holders 3 having a multiplicity of identically sized luggage compartments 7. However, there may, of course, also be different luggage compartment sizes for bulky luggage.

Figure 1B:
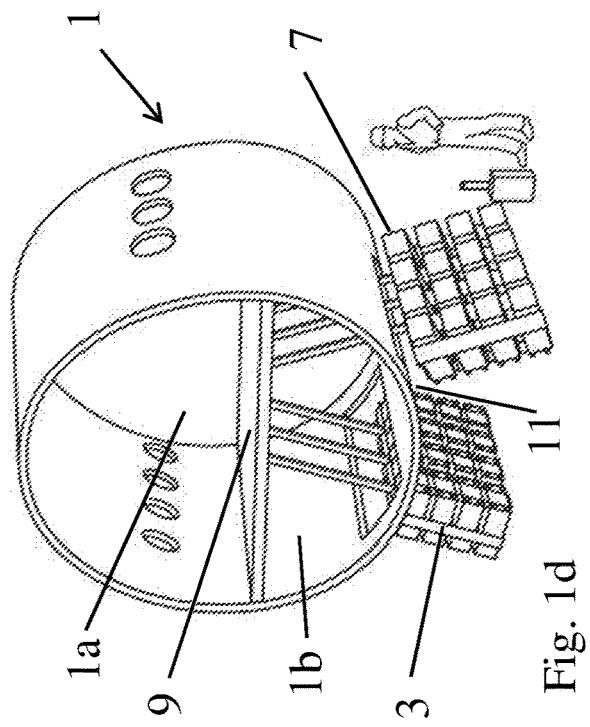
FIG. 1b shows a schematic perspective cross section through an aircraft fuselage having the luggage holder according to the invention with an open hatch.

FIG. 1b shows a schematic perspective cross section through the fuselage 1 of an aircraft having two luggage holders 3 according to the invention (as in FIG. 1a) with the hatches 5 open. If a hatch 5 is in the open state, it opens the lower fuselage region 1b to such an extent that cargo located in the luggage holder 3 can be introduced into and/or brought out from the cargo hold. A guide mechanism holds the luggage holders 3 in each case in the lower fuselage region 1b, and therefore the luggage is securely stowed in the cargo hold up to the, for example, electronic triggering of the guide mechanism. Such a guide mechanism can be, for example, a servomotor which brings about a translational and/or rotational movement of the luggage holders 3.

Figure 1C:
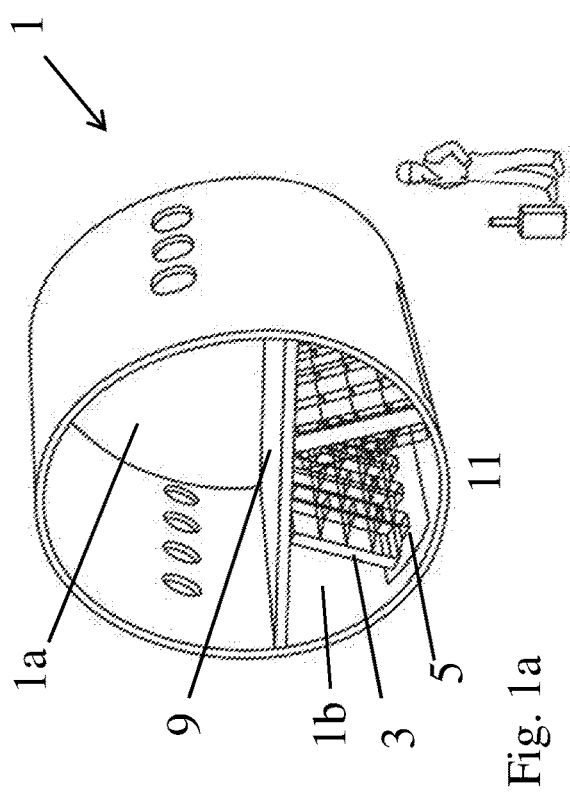
FIG. 1c shows a schematic perspective cross section through an aircraft fuselage having the luggage holder according to the invention with an open hatch (extended luggage holder without luggage)
Figure 1D:
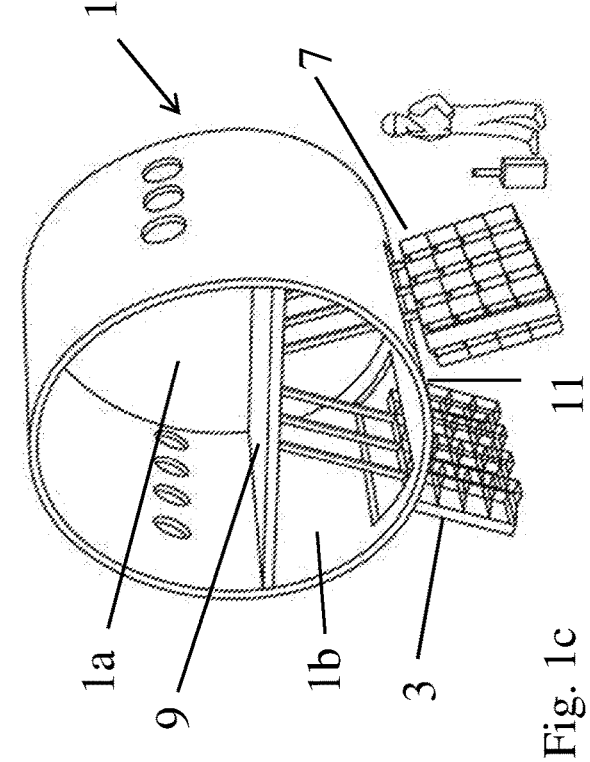
FIG. 1d shows a schematic perspective cross section through an aircraft fuselage having the luggage holder according to the invention with an open hatch (extended luggage holder with luggage)

FIG. 1c likewise shows a schematic perspective cross section through the fuselage 1 of an aircraft, also with the hatches 5 open, this time with the luggage holders 3 extended (without luggage). The luggage holders 3 can be brought here out of the cargo hold and can be introduced therein again by means of the guide mechanism in such a manner that the luggage holders, when they are brought out of the cargo hold, are arranged substantially radially with respect to the elliptical cross section of the fuselage 1.

As can be seen in FIG. 1c, the upper and the lower fuselage regions 1a, 1b are separated from each other by a separating plane 9, and therefore the cargo hold has a cargo hold ceiling. The luggage holder 3 is arranged at an angle to the separating plane 9 when it is brought out of the cargo hold.

The fuselage 1 here has a lowest region 11 which, when the aircraft is in a state landed on the ground, is closest to the ground, wherein the normal of the lowest region 11 towards the ground is approximately of a length of 100 to 130 cm.

The guide mechanism is arranged at an angle α of less than 90°, especially preferably of approximately 35° to 45°, to the perpendicular between the ground and the lowest region 11 of the fuselage 1 (also see FIG. 2c). The luggage holder 3 comprises a plurality of luggage compartments 7 for receiving luggage.

FIG. 2a shows a schematic cross section through an aircraft fuselage 1 having two luggage holders 3 according to the invention in in each case half a standard air cargo container ("L3 container") 13. According to the invention, the luggage holder 3 here is located within the outer dimensions of the standard air cargo container 13. Standard air cargo containers 13 loaded with luggage can thereby be brought into the aircraft, and therefore the loading of the aircraft or of the container by the passengers is possible even if passengers are not permitted for safety reasons to go over the apron. These standard air cargo containers 13 with the conventional dimensions of an L3 container have, on their lower side, a region through which the luggage holder 3 can be brought out of the standard air cargo container 13 with the aid of a guide mechanism. This region may be permanently open or else can be opened and closed with a type of hatch. Of course, the standard air cargo container 13 can also be a whole L3 container. The hatch 5 of the cargo hold is still closed in FIG. 2a.

A hatch 5 which is not yet completely open can be seen in FIG. 2b. The two half L3 containers 13 including their respective luggage holder 3, as already explained above, can basically either be designed to be open in the direction of the hatch 5 or else closed (like a conventional L3 container) and can have an extra hatch. The latter can be opened (for example electrically), as a whole and therefore the luggage holder 3 can then be brought out from the cargo hold along one hatch (cargo hold hatch 5) or optionally two hatches (cargo hold hatch 5 and container hatch). The opening of the container hatch can preferably be coupled electrically here to the opening of the hatch 5 of the cargo hold such that joint activation of the two hatches is also possible.

FIG. 2c finally shows how the two luggage holders 3 according to the invention have been brought out of the two half L3 containers 13 and therefore out of the cargo hold. The guide mechanism shown runs at an angle α of less than 90° to the perpendicular between the ground and the lowest region 11 of the fuselage 1. It can be seen here that the cargo hold hatch is completely open. Of course, a different opening mechanism of the cargo hold hatch than the inwardly directed sliding mechanism illustrated is also conceivable. For example, the hatch 5 may also be pivoted out of the fuselage.

The luggage holder 3 which is presented permits airport-independent distribution of luggage, where the passengers bring their luggage themselves to the cargo hold. Turn-around times are therefore shortened and the available space in the cabin increased, and therefore additional seats can be accommodated in the cabin.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising a fuselage, comprising
a substantially elliptical cross section of the fuselage, and
a separate upper fuselage region and a lower fuselage region,
wherein, the lower fuselage region comprises a cargo hold, and
wherein, the cargo hold has at least one hatch which, in the closed state, closes the lower fuselage region, and which, in the open state, opens the lower fuselage region to such an extent that cargo can be at least one of introduced into or brought out of the cargo hold,
wherein, the cargo hold comprises at least one luggage holder having at least one luggage compartment,
wherein, when the hatch is in the closed state, the luggage holder is arranged in the cargo hold, and
wherein, when the hatch is in the opened state, the luggage holder is configured to be brought out of the cargo hold and re-introduced therein again by means of a guide mechanism in such a manner that the luggage holder, when it is brought out of the cargo hold, is arranged substantially radially to the substantially elliptical cross section of the fuselage,
wherein the guide mechanism is arranged at an angle α of less than 90° to the perpendicular between the ground and the lowest region of the fuselage, such that the luggage holder exits the cargo hold along the angle.

2. The aircraft according to claim 1, wherein the fuselage has a lowest region which, when the aircraft is in a state landed on the ground, is closest to the ground, wherein a normal of the lowest region to the ground is approximately of a length of 100 to 130 cm.

3. The aircraft according to claim 1, wherein the luggage holder has at least one luggage compartment for receiving luggage.

4. The aircraft according to claim 3, wherein the at least one luggage compartment is configured to receive luggage of up to approximately 23 kg.

5. The aircraft according to claim 3, wherein the at least one luggage compartment has securing means for holding luggage.

6. The aircraft according to claim 3, wherein the at least one luggage compartment has an identification reading means for luggage located therein.

7. The aircraft according to claim 3, wherein the luggage holder is arranged in an air cargo container.

* * * * *